United States Patent Office 2,927,030
Patented Mar. 1, 1960

2,927,030

METHOD OF TREATING MEAT

Richard A. Gaumer, Kutztown, Pa., assignor to North American Research Corporation, Trexlertown, Pa., a corporation of Pennsylvania No Drawing. Application February 12, 1958
Serial No. 714,686

7 Claims. (Cl. 99—194)

This invention relates to meat products and methods of treating meat to obtain such products, and more particularly to the production of veal and beef products in an improved form.

It is the principal object of the present invention to provide an improved meat product, of veal and the like, and which can be in the form of cutlets, cubed steaks and the like, or beef and the like, and which can be made in the form of cubed steaks or other forms.

It is a further object of the present invention to provide improved methods of treating meat so that improved products are obtained which are tender, attractive in appearance, and highly palatable.

It is a further object of the present invention to provide improved methods of treating meat from cattle or of bovine family origin, and particularly veal and/or beef, in which the steps employed are relatively simple and can readily be kept under control.

It is a further object of the present invention to provide improved methods of treating meat of bovine family origin, and particularly veal, beef and the like, by which products can be obtained which are attractive and salable and which can be made at a lower cost than similar products which are now available.

It is a further object of the present invention to provide improved methods of treating meat of bovine family origin by which the nutritive constituents are retained and augmented in the product resulting from carrying out the methods of treating the meat.

Other objects and advantageous features of the invention will be apparent from the description and claims.

The nature and characteristic features of the invention will be more readily understood from the following description, although it should, of course, be understood that various modifications and changes can be made in the steps disclosed without departing from the spirit of the invention.

In accordance with one preferred form and practice of the present invention, and as one component or constituent, any cuts are employed from veal or calf carcasses, of bovine family origin, and these veal cuts are initially prepared in the desired sizes and thicknesses for convenience in handling. The veal cuts can be sliced into thin pieces, of a thickness of the order of one-eighth of an inch or less, or if desired, and if thicker or tougher cuts are utilized, the veal cuts are then tenderized in the usual manner with knives or the like, the tenderizing action preferably being applied to the cuts of meat from opposite sides. The tenderizing operation is preferably carried out at a meat temperature in the range from about 32° F. to 55° F. The veal cuts whether sliced as described or mechanically tenderized, are ready for further treatment as subsequently described.

In accordance with this preferred form and practice of the invention, and as another component or constituent, veal in frozen and powdered form is employed. For this constituent, any veal cuts are employed, preferably substantially dry, and preferably of a commercial or lower grade.

The veal cuts for freezing and powdering are first prepared in suitable sizes for further working and are finely ground with a conventional type of meat grinder with an orifice plate having openings of a diameter of the order of ¼ to ⅜ inches, although smaller sizes, down to ¹⁄₁₆ inch, can be employed. The meat, as thus ground, is then placed in a suitable container and is frozen so that the mass is completely in a frozen state throughout, the temperature for this purpose preferably being of the order of 0° F. to —40° F., although operation at lower temperatures could be effected. There does not, however, appear to be any advantage in employing the lower limits of this range or still lower temperatures. While in this frozen state, the meat can then be cut, if necessary, in any preferred manner, such as by power saws, or the like, and of a size such that the pieces can be reduced to powdered form in the frozen state. The size will be determined by the throat size of the equipment employed and where larger grinders are employed sawing may not be required if the pieces are of a size such that they can be inserted without sawing.

The veal in powdered form is preferably the same in appearance, other than color, to ground wheat flour.

While any preferred equipment can be used for effecting the production of the veal in powdered form, it has been found that if it is passed through a grinder having an orifice plate with holes of the order of ⅜ or ¼ inch and with the temperature of the order of 0° F., or lower, the desired powdered state can be achieved. It has been ascertained that the powdering action can be achieved at temperatures as low as —30° or —40° F., but that a temperature of —10° F. is quite satisfactory, and temperatures below that range merely require unnecessary refrigeration.

The thin slices of veal or the tenderized veal, preferably in a cold room maintained at a temperature of about 50° F., are at or brought to a temperature of the order of 40° F. to 50° F., are then placed in a mixer and the frozen powdered veal added thereto, the temperature of the powder, when added, being about 0° F. to —10° F. The whole is agitated in the mixer for a period of about three minutes or until the powdered veal has thoroughly covered the slices or the pieces of tenderized veal, and filled any interstices therein. The agitation is preferably discontinued before the powdered veal has had an opportunity to attain a thawed conditon. The final temperature of the material, upon completion of the agitation, will preferably be maintained below about 28° F.

While it is preferred for some products, and particularly cube steaks of veal, that equal parts by weight of the thin sliced or of the tenderized veal, and of the frozen powdered veal be employed, the quantity of frozen powdered veal, in parts by weight, can range from one part of frozen powdered veal to four parts of sliced or tenderized veal for some finished products, and to three parts of frozen powdered veal to four parts of sliced or tenderized veal, for other finished products, and also dependent upon the condition of the veal.

The sliced or tenderized veal tends to have a higher initial cost than the veal which is converted to frozen powdered form. The variation in proportions will not appreciably affect the appearance or taste of the final product but the chewing properties when cooked will be different. Less chewing will be required where a higher powder content is employed.

Upon the completion of the mixing in the mixer the mass is formed or shaped into usable sizes, including those corresponding to cutlets, frozen at temperature in the range of 0° F. to —40° F., —10° F. being preferred, packaged, and retained in the packaged and frozen condition until ready for use.

The manner of use of the frozen product varies with different users but customarily the meat in frozen form is introduced directly into the pan or onto a grill plate and subjected to heat for cooking in the manner customarily employed with veal cutlets, cube steaks of veal, veal chops and the like. It can, of course, be coated with bread crumbs, prior to cooking, in a manner well known with veal.

In accordance with another preferred form and practice of the present invention, and as one component or constituent, beef cuts are employed, preferably substantially dry and preferably of a commercial or lower grade of beef, and while beef from cows and steers can be employed it is preferred to use beef from young heifers or bulls.

These beef cuts are initially prepared in the desired sizes and thicknesses for convenience in handling. The beef cuts can be sliced into thin pieces of a thickness of the order of one eighth of an inch or less, or if desired, and if thicker or tougher cuts of beef are utilized, the beef cuts are then tenderized in the usual manner with knives or the like, the tenderizing action preferably being applied to the cuts of meat from opposite sides. The tenderizing operation is preferably carried out at a meat temperature in the range from about 32° F. to 55° F. The beef cuts whether sliced as described or mechanically tenderized are ready for further treatment as subsequently described.

In accordance with this other preferred form and practice of the invention, and as another component or constituent, beef in frozen and powdered form is employed. For this constituent, beef cuts are employed, preferably substantially dry, and preferably of a commercial or lower grade of beef, and while beef from cows and steers can be employed, it is preferred to use beef from young heifers or bulls.

The beef cuts for freezing and powdering, and free from bones, are first prepared in suitable sizes for further working and are finely ground with a conventional type of meat grinder with an orifice plate having openings of a diameter of the order of ¼ to ⅜ inch, although smaller sizes, down to ⅟₁₆ inch, can be employed. The meat, as thus ground, is then placed in a suitable container and is frozen so that the mass is completely in a frozen state throughout, the temperature for this purpose preferably being of the order of 0° F. to —40° F., although operation at lower temperatures could be effected. There does not, however, appear to be any advantage in employing the lower limits of this range or still lower temperatures. While in this frozen state, the meat can then be cut, if necessary, in any preferred manner, such as by power saws, or the like, and of a size such that the pieces can be reduced to powdered form in the frozen state. The size will be determined by the throat size of the equipment employed and where larger grinders are employed sawing may not be required if the pieces are of a size such that they can be inserted without sawing.

The powdered form is preferably the same in appearance, other than color, to ground wheat flour. The color will be determined by the temperature of the meat when it is reduced to powdered form and will range from pink, at the upper temperature limits, to white, at the lower limits stated.

While any preferred equipment can be used for effecting the production of the meat in powdered form, it has been found that if it is passed through a grinder having an orifice plate with holes of the order of ⅜ or ¼ inch and with the temperature of the order of 0° F., or lower, the desired powdered state can be achieved. It has been ascertained that the powdering action can be achieved at temperatures as low as —30° or —40° F., but that a temperature of —10° F. is quite satisfactory, and temperatures below that range merely require unnecessary refrigeration.

The thin slices of beef or the tenderized beef cuts, preferably in a cold room maintained at a temperature of about 50° F. are at or are brought to a temperature of the order of 40° F. to 50° F., are then placed in a mixer and the frozen powdered beef added thereto, the temperature of the frozen beef powder, when added being about 0° F. to —10° F. The whole is agitated in the mixer for a period of about three minutes, or until the powdered beef has thoroughly covered the pieces of thin sliced or tenderized beef and filled any interstices therein. The agitation is preferably discontinued before the powdered beef has had an opportunity to attain a thawed condition. The final temperature of the material upon completion of the agitation will preferably be maintained below about 28° F.

While it is preferred for some products, and particularly cube steak of beef, that equal parts by weight of the thin sliced or of the tenderized beef, and of the frozen powdered beef be employed, the quantity of frozen powdered beef, in parts by weight, can range from one part of frozen powdered beef to four parts of thin sliced or tenderized beef for some finished products, and to three parts of frozen powdered beef to four parts of thin sliced or tenderized beef, for other finished products, and also dependent upon the condition of the beef.

The sliced or tenderized beef tends to have a higher initial cost than the beef which is converted to frozen powdered form. The variation in proportions will not appreciably affect the appearance or taste of the final product but the chewing properties, when cooked, will be different. Less chewing will be required where a higher powder content is employed.

Upon the completion of the mixing in the mixer the mass is formed or shaped into usable sizes, including those corresponding to cube steaks, frozen at temperatures in the range from 0° F. to —40° F., —10° F. being preferred, packaged, and retained in the packaged and frozen condition until ready for use.

The manner of use of the frozen product varies with different users but customarily the meat in frozen form is introduced directly into the pan or onto a grill plate and subjected to heat for cooking in the manner customarily employed with cube steak, and the like.

This application is a continuation in part of my prior application Serial No. 661,290, filed May 24, 1957, now abandoned.

I claim:

1. The method of making a meat product which comprises agitating chilled meat cuts of bovine family origin with meat of bovine family origin in frozen powdered form and covering the meat cuts with said frozen powdered meat, forming the material thus obtained into the desired shape, and freezing the shaped material.

2. The method of making a meat product which comprises agitating chilled cuts of meat selected from the group consisting of beef and veal with frozen powdered meat of the same kind to coat the cuts therewith without substantial thawing of the powdered meat the frozen powdered meat in parts by weight being in the range from about one to three parts thereof to four parts of the cuts of meat, forming the material thus obtained into the desired shape, and freezing the shaped material.

3. The method of making a meat product which comprises mechanically tenderizing cuts of meat selected from the group consisting of beef and veal at a temperature in the range from about 32° F. to 55° F., agitating the cuts with the same kind of meat in frozen powdered form and coating the cuts and fill the interstices thereof without substantial thawing of the powdered meat, forming the material thus obtained into the desired shape, and freezing the shaped material at a temperature in the range from 0° F. to —40° F.

4. The method of making a meat product which comprises agitating chilled veal cuts with veal in frozen powdered form and coating the veal cuts therewith without substantial thawing of the powdered veal, forming the material thus obtained into the desired shape, and freezing the shaped material.

5. The method of making a meat product which comprises mechanically tenderizing veal cuts and chilling the same, agitating the chilled tenderized veal cuts with veal in frozen powdered form and coating the veal cuts and filling the interstices of the veal cuts, forming the material thus obtained into the desired shape, and freezing the shaped material.

6. The method of making a meat product which comprises agitating chilled beef cuts with beef in frozen powdered form and coating the beef cuts therewith without substantial thawing of the powdered beef, forming the material thus obtained into the desired shape, and freezing the shaped material.

7. The method of making a meat product which comprises mechanically tenderizing beef cuts and chilling the same, agitating the chilled tenderized beef cuts with beef in frozen powdered form and coating the beef cuts and filling the interstices of the beef cuts, forming the material thus obtained into the desired shape, and freezing the shaped material.

References Cited in the file of this patent

UNITED STATES PATENTS

| | | |
|---|---|---|
| 2,242,451 | Carpenter | May 20, 1941 |
| 2,673,156 | Minder | Mar. 23, 1954 |
| 2,752,252 | Condon | June 26, 1956 |
| 2,852,395 | Gaumer | Sept. 16, 1958 |